(12) United States Patent
Banerjee et al.

(10) Patent No.: US 9,810,824 B2
(45) Date of Patent: Nov. 7, 2017

(54) OMNIDIRECTIONAL HIGH CHROMA RED STRUCTURAL COLORS

(71) Applicant: Toyota Motor Engineering & Manufacturing North America, Inc., Erlanger, KY (US)

(72) Inventors: Debasish Banerjee, Ann Arbor, MI (US); Li Qin Zhou, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 15/144,283

(22) Filed: May 2, 2016

(65) Prior Publication Data

US 2016/0245969 A1 Aug. 25, 2016

Related U.S. Application Data

(63) Continuation-in-part of application No. 14/793,117, filed on Jul. 7, 2015, which is a continuation-in-part (Continued)

(51) Int. Cl.
    *G02B 1/10* (2015.01)
    *G02B 5/28* (2006.01)
    (Continued)

(52) U.S. Cl.
    CPC ............ *G02B 5/286* (2013.01); *G02B 5/0825* (2013.01); *G02B 5/0858* (2013.01); *G02B 5/26* (2013.01)

(58) Field of Classification Search
    CPC .... G02B 5/286; G02B 5/0825; G02B 5/0858; G02B 5/26; G02B 5/207; G02B 1/10; (Continued)

(56) References Cited

U.S. PATENT DOCUMENTS 3,247,392 A 4/1966 Thelen
3,650,790 A 3/1972 Klenke et al.
(Continued)

FOREIGN PATENT DOCUMENTS

CN 1527100 A 9/2004
CN 1741246 A 3/2006
(Continued)

OTHER PUBLICATIONS

"Laser 2000 Gmbttp://www.laser2000.de/fileadmin/Produkdaten/ SK_WEB/Datenblaetter_SEM/SEMROCK-StopLine-Notchfilter. pdf, accessed Feb. 2, 2010".
(Continued)

*Primary Examiner* — Euncha Cherry
(74) *Attorney, Agent, or Firm* — Dinsmore & Shohl LLP

(57) ABSTRACT

A multilayer thin film that reflects an omnidirectional high chroma red structural color. The multilayer thin film may include a reflector layer, at least one absorber layer extending across the reflector layer, and an outer dielectric layer extending across the at least one absorber layer. The multilayer thin film reflects a single narrow band of visible light when exposed to white light and the outer dielectric layer has a thickness of less than or equal to 2.0 quarter wave (QW) of a center wavelength of the single narrow band of visible light.

20 Claims, 6 Drawing Sheets

Related U.S. Application Data of application No. 14/607,933, filed on Jan. 28, 2015, application No. 15/144,283, filed on May 2, 2016, which is a continuation-in-part of application No. 14/793,123, filed on Jul. 7, 2015, now Pat. No. 9,664,832, which is a continuation-in-part of application No. 14/607,933, filed on Jan. 28, 2015, application No. 15/144,283, filed on May 2, 2016, which is a continuation-in-part of application No. 14/793,133, filed on Jul. 7, 2015, now Pat. No. 9,658,375, which is a continuation-in-part of application No. 14/607,933, filed on Jan. 28, 2015.

(51) Int. Cl.
*G02B 5/08* (2006.01)
*G02B 5/26* (2006.01)

(58) Field of Classification Search
CPC ...... G02B 1/105; G02B 1/115; G02B 27/142; B32B 7/02; B32B 9/00; C09C 1/0015
USPC ............................................. 359/584
See application file for complete search history.

(56) References Cited

U.S. PATENT DOCUMENTS

| | | |
|---|---|---|
| 3,769,515 A | 10/1973 | Clark, Jr. |
| 3,885,408 A | 5/1975 | Clark, Jr. |
| 3,910,681 A | 10/1975 | Elliott et al. |
| 3,953,643 A | 4/1976 | Cheung et al. |
| 4,079,605 A | 3/1978 | Bartels |
| 4,449,126 A | 5/1984 | Pekker |
| 4,525,028 A | 6/1985 | Dorschner |
| 4,544,415 A | 10/1985 | Franz et al. |
| 4,556,599 A | 12/1985 | Sato et al. |
| 4,613,622 A | 9/1986 | Moeller et al. |
| 4,643,518 A | 2/1987 | Taniguchi |
| 4,673,914 A | 6/1987 | Lee |
| 4,705,839 A | 11/1987 | Martin |
| 4,714,308 A | 12/1987 | Sawamura et al. |
| 4,753,829 A | 6/1988 | Panush |
| 4,756,602 A | 7/1988 | Southwell et al. |
| 4,868,559 A | 9/1989 | Pinnow |
| 4,896,928 A | 1/1990 | Perilloux et al. |
| 4,996,105 A | 2/1991 | Oyama et al. |
| 5,007,710 A | 4/1991 | Nakajima et al. |
| 5,043,593 A | 8/1991 | Tsutsumi et al. |
| RE33,729 E | 10/1991 | Perilloux |
| 5,132,661 A | 7/1992 | Pinnow |
| 5,138,468 A | 8/1992 | Barbanell |
| 5,183,700 A | 2/1993 | Austin |
| 5,214,530 A | 5/1993 | Coombs et al. |
| 5,245,329 A | 9/1993 | Gokcebay |
| 5,279,657 A | 1/1994 | Phillips et al. |
| 5,283,431 A | 2/1994 | Rhine |
| 5,323,416 A | 6/1994 | Bhat et al. |
| 5,423,912 A | 6/1995 | Sullivan et al. |
| 5,424,119 A | 6/1995 | Phillips et al. |
| 5,437,931 A | 8/1995 | Tsai et al. |
| 5,472,798 A | 12/1995 | Kumazawa et al. |
| 5,491,470 A | 2/1996 | Veligdan |
| 5,543,665 A | 8/1996 | Demarco |
| 5,561,420 A | 10/1996 | Kleefeldt et al. |
| 5,569,332 A | 10/1996 | Glatfelter et al. |
| 5,569,353 A | 10/1996 | Zodrow |
| 5,569,535 A | 10/1996 | Phillips et al. |
| 5,570,847 A | 11/1996 | Phillips et al. |
| 5,571,624 A | 11/1996 | Phillips et al. |
| 5,653,792 A | 8/1997 | Phillips et al. |
| 5,691,844 A | 11/1997 | Oguchi et al. |
| 5,700,550 A | 12/1997 | Uyama et al. |
| 5,759,255 A | 6/1998 | Venturini et al. |
| 5,768,026 A | 6/1998 | Kiyomoto et al. |
| 5,850,309 A | 12/1998 | Shirai et al. |
| 5,889,603 A | 3/1999 | Roddy et al. |
| 5,982,078 A | 11/1999 | Krisl et al. |
| 6,049,419 A | 4/2000 | Wheatley et al. |
| 6,055,079 A | 4/2000 | Hagans et al. |
| 6,130,780 A | 10/2000 | Joannopoulos et al. |
| 6,150,022 A | 11/2000 | Coulter et al. |
| 6,156,115 A | 12/2000 | Pfaff et al. |
| 6,157,480 A | 12/2000 | Anderson et al. |
| 6,157,489 A | 12/2000 | Bradley, Jr. et al. |
| 6,157,498 A | 12/2000 | Takahashi |
| 6,180,025 B1 | 1/2001 | Schoenfeld et al. |
| 6,215,592 B1 | 4/2001 | Pelekhaty |
| 6,242,056 B1 | 6/2001 | Spencer et al. |
| 6,243,204 B1 | 6/2001 | Bradley, Jr. et al. |
| 6,246,523 B1 | 6/2001 | Bradley, Jr. et al. |
| 6,249,378 B1 | 6/2001 | Shimamura et al. |
| 6,310,905 B1 | 10/2001 | Shirai |
| 6,331,914 B1 | 12/2001 | Wood, II et al. |
| 6,383,638 B1 | 5/2002 | Coulter et al. |
| 6,387,457 B1 | 5/2002 | Jiang et al. |
| 6,387,498 B1 | 5/2002 | Coulter et al. |
| 6,399,228 B1 | 6/2002 | Simpson |
| 6,433,931 B1 | 8/2002 | Fink et al. |
| 6,451,414 B1 | 9/2002 | Wheatley et al. |
| 6,475,273 B1 | 11/2002 | Zimmermann et al. |
| 6,534,903 B1 | 3/2003 | Spiro et al. |
| 6,565,770 B1 | 5/2003 | Mayer et al. |
| 6,569,527 B1 | 5/2003 | Calhoun et al. |
| 6,574,383 B1 | 6/2003 | Erchak et al. |
| 6,582,764 B2 | 6/2003 | Fuller et al. |
| 6,596,070 B1 | 7/2003 | Schmidt et al. |
| 6,618,149 B1 | 9/2003 | Stirton |
| 6,624,945 B2 | 9/2003 | Fan et al. |
| 6,667,095 B2 | 12/2003 | Wheatley et al. |
| 6,686,042 B1 * | 2/2004 | LeGallee ............ B32B 7/02 106/404 |
| 6,699,313 B2 | 3/2004 | Coulter et al. |
| 6,753,952 B1 | 6/2004 | Lawrence et al. |
| 6,844,976 B1 | 1/2005 | Firon et al. |
| 6,873,393 B2 | 3/2005 | Ma |
| 6,887,526 B1 | 5/2005 | Arlt et al. |
| 6,894,838 B2 | 5/2005 | Mizrahi et al. |
| 6,903,873 B1 | 6/2005 | Joannopoulos et al. |
| 6,913,793 B2 | 7/2005 | Jiang et al. |
| 6,927,900 B2 | 8/2005 | Liu et al. |
| 6,997,981 B1 | 2/2006 | Coombs et al. |
| 7,049,003 B2 | 5/2006 | Thomsen et al. |
| 7,052,762 B2 | 5/2006 | Hebrink et al. |
| 7,064,897 B2 | 6/2006 | Hebrink et al. |
| 7,098,257 B2 | 8/2006 | Rink et al. |
| 7,106,516 B2 | 9/2006 | Lotz et al. |
| 7,123,416 B1 | 10/2006 | Erdogan et al. |
| 7,141,297 B2 | 11/2006 | Condo et al. |
| 7,169,472 B2 | 1/2007 | Raksha et al. |
| 7,184,133 B2 | 2/2007 | Coombs et al. |
| 7,190,524 B2 | 3/2007 | Grawert et al. |
| 7,215,473 B2 | 5/2007 | Fleming |
| 7,236,296 B2 | 6/2007 | Liu et al. |
| 7,267,386 B2 | 9/2007 | Hesch |
| 7,326,967 B2 | 2/2008 | Hsieh et al. |
| 7,329,967 B2 | 2/2008 | Nozawa et al. |
| 7,352,118 B2 | 4/2008 | Chowdhury et al. |
| 7,367,691 B2 | 5/2008 | Lin |
| 7,410,685 B2 | 8/2008 | Rosenberger et al. |
| 7,413,599 B2 | 8/2008 | Henglein et al. |
| 7,446,142 B2 | 11/2008 | Meisenburg et al. |
| 7,452,597 B2 | 11/2008 | Bujard |
| 7,483,212 B2 | 1/2009 | Cho et al. |
| 7,638,184 B2 | 12/2009 | Yaoita et al. |
| 7,667,895 B2 | 2/2010 | Argoitia et al. |
| 7,699,350 B2 | 4/2010 | Heim |
| 7,699,927 B2 | 4/2010 | Henglein et al. |
| 7,745,312 B2 | 6/2010 | Herner et al. |
| 7,847,342 B2 | 12/2010 | Fukuzumi et al. |
| 7,851,580 B2 | 12/2010 | Li et al. |
| 7,859,754 B2 | 12/2010 | Falicoff |
| 7,863,672 B2 | 1/2011 | Jin et al. |
| 7,903,339 B2 | 3/2011 | Banerjee et al. |
| 7,929,730 B2 | 4/2011 | Huang et al. |

(56) References Cited

U.S. PATENT DOCUMENTS

| | | |
|---|---|---|
| 7,980,711 B2 | 7/2011 | Takayanagi et al. |
| 8,013,383 B2 | 9/2011 | Kidoh et al. |
| 8,257,784 B2 | 9/2012 | Grayson et al. |
| 8,313,798 B2 | 11/2012 | Nogueira et al. |
| 8,323,391 B2 | 12/2012 | Banerjee et al. |
| 8,329,247 B2 | 12/2012 | Banerjee et al. |
| 8,350,314 B2 | 1/2013 | Fukuzumi et al. |
| 8,440,014 B2 | 5/2013 | Kitamura et al. |
| 8,446,666 B2 | 5/2013 | Kurt et al. |
| 8,593,728 B2 | 11/2013 | Banerjee et al. |
| 8,599,464 B2 | 12/2013 | Park |
| 8,619,365 B2 | 12/2013 | Harris et al. |
| 8,736,959 B2 | 5/2014 | Grayson et al. |
| 9,063,291 B2 | 6/2015 | Banerjee et al. |
| 2001/0022151 A1 | 9/2001 | Sliwinski et al. |
| 2002/0030882 A1 | 3/2002 | Vitt et al. |
| 2002/0096087 A1 | 7/2002 | Glausch |
| 2002/0117080 A1 | 8/2002 | Okutsu et al. |
| 2002/0129739 A1 | 9/2002 | Yanagimoto et al. |
| 2003/0002157 A1 | 1/2003 | Someno |
| 2003/0059549 A1 | 3/2003 | Morrow et al. |
| 2003/0190473 A1 | 10/2003 | Argoitia et al. |
| 2004/0047055 A1 | 3/2004 | Mizrahi et al. |
| 2004/0156984 A1 | 8/2004 | Vitt et al. |
| 2004/0179267 A1 | 9/2004 | Moon et al. |
| 2004/0191540 A1 | 9/2004 | Jakobi et al. |
| 2004/0246477 A1 | 12/2004 | Moon et al. |
| 2004/0252509 A1 | 12/2004 | Lin |
| 2004/0263983 A1 | 12/2004 | Acree |
| 2004/0265477 A1 | 12/2004 | Nabatova-Gabain et al. |
| 2005/0126441 A1 | 6/2005 | Skelhorn |
| 2005/0132929 A1 | 6/2005 | Raksha et al. |
| 2005/0152417 A1 | 7/2005 | Lin |
| 2005/0235714 A1 | 10/2005 | Lindstrom |
| 2005/0264874 A1 | 12/2005 | Lin |
| 2006/0006402 A1 | 1/2006 | Hsieh et al. |
| 2006/0030656 A1 | 2/2006 | Tarng et al. |
| 2006/0081858 A1 | 4/2006 | Lin et al. |
| 2006/0145172 A1 | 7/2006 | Su et al. |
| 2006/0155007 A1 | 7/2006 | Huber |
| 2006/0159922 A1 | 7/2006 | O'Keefe |
| 2006/0222592 A1 | 10/2006 | Burda |
| 2007/0097509 A1 | 5/2007 | Nevitt et al. |
| 2007/0221097 A1 | 9/2007 | Tarng et al. |
| 2009/0046368 A1 | 2/2009 | Banerjee et al. |
| 2009/0082659 A1 | 3/2009 | Ham et al. |
| 2009/0153953 A1 | 6/2009 | Banerjee et al. |
| 2009/0161220 A1 | 6/2009 | Banerjee et al. |
| 2009/0241802 A1 | 10/2009 | Nemoto et al. |
| 2009/0303044 A1 | 12/2009 | Furuichi et al. |
| 2009/0321693 A1 | 12/2009 | Ohkuma et al. |
| 2010/0064938 A1 | 3/2010 | Voit et al. |
| 2010/0208338 A1 | 8/2010 | Banerjee et al. |
| 2010/0209593 A1 | 8/2010 | Banerjee et al. |
| 2010/0213485 A1 | 8/2010 | McKenzie et al. |
| 2011/0014366 A1 | 1/2011 | Nogueira et al. |
| 2011/0091658 A1 | 4/2011 | Banerjee et al. |
| 2011/0113984 A1 | 5/2011 | Fuller, Jr. et al. |
| 2011/0128616 A1 | 6/2011 | Banerjee et al. |
| 2011/0134515 A1 | 6/2011 | Banerjee et al. |
| 2011/0228399 A1 | 9/2011 | Ohnishi |
| 2011/0266879 A1 | 11/2011 | Kim et al. |
| 2011/0267247 A1 | 11/2011 | Choi et al. |
| 2011/0299154 A1 | 12/2011 | Grayson et al. |
| 2012/0050848 A1 | 3/2012 | Carlson et al. |
| 2012/0107584 A1 | 5/2012 | Eibon et al. |
| 2012/0307369 A1 | 12/2012 | Banerjee et al. |
| 2013/0148221 A1 | 6/2013 | Banerjee et al. |
| 2013/0213260 A1 | 8/2013 | Kunii |
| 2013/0250403 A1 | 9/2013 | Maeda |
| 2013/0265668 A1 | 10/2013 | Banerjee et al. |
| 2014/0018439 A1 | 1/2014 | Gruner et al. |
| 2014/0111861 A1 | 4/2014 | Banerjee et al. |
| 2014/0211303 A1 | 7/2014 | Banerjee et al. |
| 2014/0368918 A1 | 12/2014 | Banerjee et al. |
| 2015/0033988 A1 | 2/2015 | Wu et al. |
| 2015/0138642 A1 | 5/2015 | Banerjee et al. |
| 2015/0309231 A1 | 10/2015 | Banerjee |
| 2015/0309232 A1 | 10/2015 | Banerjee |

FOREIGN PATENT DOCUMENTS

| | | |
|---|---|---|
| DE | 2106613 A1 | 8/1971 |
| EP | 141143 B1 | 5/1985 |
| JP | 07034324 | 2/1995 |
| JP | 2000220331 A | 8/2000 |
| JP | 2000329933 A | 11/2000 |
| JP | 2005144925 A | 6/2005 |
| JP | 2006506518 A | 2/2006 |
| JP | 2006097426 A | 4/2006 |
| JP | 2008038382 A | 2/2008 |
| WO | 99/42892 A1 | 8/1999 |
| WO | 00/22466 A1 | 4/2000 |
| WO | 0031571 A1 | 6/2000 |
| WO | 02054030 A2 | 7/2002 |
| WO | 03062871 A1 | 7/2003 |

OTHER PUBLICATIONS

Almeida, R.M. et al., "Photonic Bandgap Materials and Structures by Sol-Gel Processing", Journal of Non-Crystalline Solids 326 &327, 405-409 (2003).

Banerjee, D. et al., "Narrow-band Omnidirectional Structural Color", SAE World Congress 01-1049 (2008).

Bendiganavale A.K., Malshe, V.C., "Infrared Reflective Inorganic Pigments", Recent Patents on Chemical Engineering, 2008, 1, 67-79.

Bing-Xin Wei et al., "Detrimental Thixotropic Thinning of Filter Cake of SiO2—Al2O3 Composite Coated TiO2 Particles and Its Control", Industrial & Engineering Chemistry Research, Sep. 27, 2011, 50, pp. 13799-13804.

Bruyant, A. et al., "All-Silicon Omnidirectional Mirrors Based on One-Dimensional Photonic Crystals", Appl. Phys. Lett. vol. 82, No. 19, May 12, 2003.

Chen, Kevin M. et al., "Si02/Ti02 Omnidirectional Reflector and Microcavity Resonator via the Sol-Gel Method", Appl. Phys. Lett., vol. 75, No. 24, Dec. 13, 1999.

Chigrin, D.N. et al., "Observation of Total Omnidirectional Reflection From a One-Dimensional Dielectric Lattice", Appl. Phys. A. 68, 25-28 (1999).

Clement, T.J. et al., "Improved Omnidirectional Reflectors in Chalcogenide Glass and Polymer by Using the Silver Doping Tachnique", Optics Express, vol. 14, No. 5, 1789-1796 (Mar. 6, 2006).

D.P. Young, Jr., et al. "Comparison of Avian Responses to UV-Light Reflective Paint on Wind Turbines," National Renewable Energy Laboratory, Subcontract Report, Jan. 2003.

Decorby, R.G. et al., "Planar Omnidirectional Reflectors in Chalcogenide Glass and Polymer" Optics Express, vol. 13, No. 16, 6228-6233, Aug. 8, 2005.

Deopura, M. et al., "Dielectric Omnidirectional Visible Reflector," Optics Letters, Aug. 1, 2001, vol. 16, No. 15, pp. 1197-1199.

Distributed Bragg Reflector; en.wikipedia.org/wiki/Bragg_reflector (2005).

Fink, Yoel et al., "A Dielectric Omnidirectional Reflector", Science, vol. 282, 1679-1682, Nov. 27, 1998.

Hongqiang et al, "Disordered dielectric high reflectors with broadband from visible to infrared," Appl. Phys. Lett., vol. 74, No. 22, 3260-3262, May 31, 2009.

Kaminska, Kate et al., "Birefringent Omnidirectional Reflector", Applied Optics, vol. 43, No. 7, Mar. 2004, pp. 1570-1576.

Lee, Hyun et al, "Design and Evaluation of Omnidirectional One-Dimensional Photonic Crystals", J. of Appl. Phys. vol. 93, No. 2, 819-830, Jan. 15, 2003.

Lin, Weihua et al., "Design and Fabrication of Omnidirectional Reflectors in the Visible Range" Journal of Modern Optics, vol. 52, No. 8, 1155 (2005).

(56) References Cited

OTHER PUBLICATIONS

Maier, E.J. "To Deal With the Invisible: On the biological significance of ultraviolet sensitivity in birds." Naturwissenschaften 80: 476-478 (1993).
Nixon, J., "Twinkle, Twinkle Little Star," Asia Pacific Coatings Journal, Feb. 20-24, 2004.
Park, Y. et al., "GaAs-based Near-infrared Omnidirectional Reflector", Appl. Phys. Lett., vol. 82, No. 17, 2770-2772, Apr. 28, 2003.
Photonic Crystal; en.wikipedia.org/wiki/Photonic_crystals (2003).
Sajeev John et al., "Photonic Band Gap Materials: A Semiconductor for Light", Department of Physics, University of Toronto, p. 1-23; 2001.
Schmid, Raimund and Mronga, Norbert, "A New Generation of Sparkling Effect Pigments", Paint & Coatings Industry; Oct. 2004, vol. 20 Issue 10, p. 118-121.
Tikhonravov, et al., "Application of the Needle Optimization Technique to the Design of Optical Coatings", Applied Optics, Optical Society of America, 1996, pp. 5493-5508, vol. 35, No. 28.
Xifre-Perez et al, "Porous silicon mirrors with enlarged omnidirectional band gap," Journal of Applied Physics, American Institute of Physics, Melville, NY, US, vol. 97, No. 6, dated Mar. 9, 2005.
Tikhonravov, Alexander V. et al., "Optical Coating Design Algorithm Based on the Equivalent Layers Theory", Applied Optics: vol. 45, No. 7; Mar. 2006; pp. 1530-1538.

\* cited by examiner

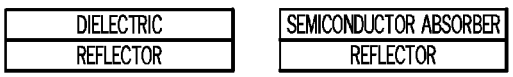
FIG. 1A  FIG. 1B  FIG. 1C
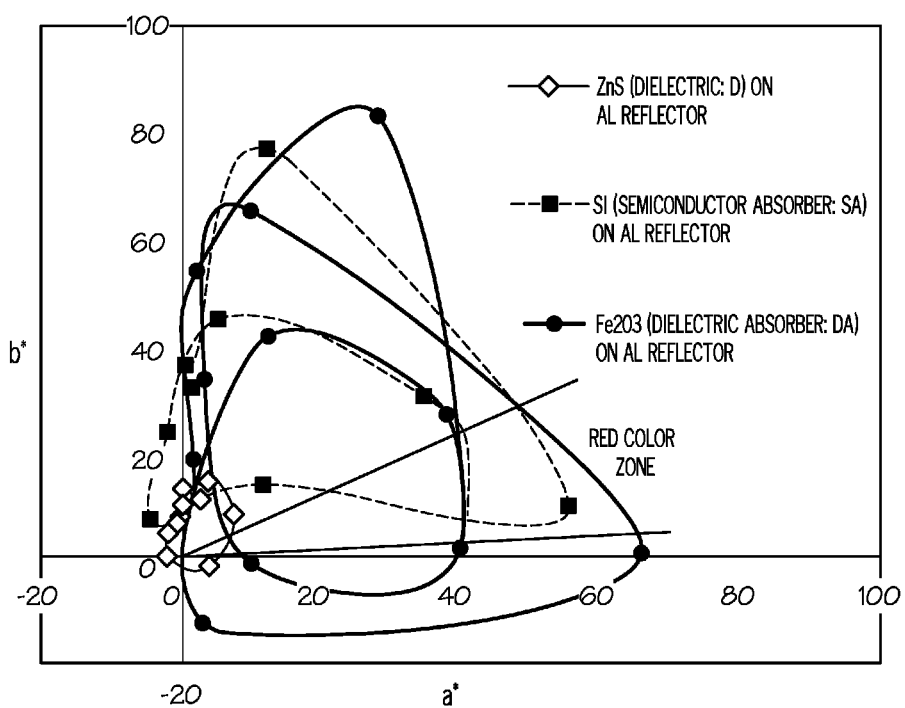
FIG. 2

OMNIDIRECTIONAL HIGH CHROMA RED STRUCTURAL COLORS

CROSS-REFERENCE TO RELATED APPLICATIONS

The instant application is a continuation-in-part (CIP) of U.S. patent application Ser. Nos. 14/793,117; 14/793,123; 14/793,133, all of which filed on Jul. 7, 2015, all of which are CIPs of U.S. patent application Ser. No. 14/607,933 filed on Jan. 28, 2015, all of which are incorporated in their entirety by reference.

TECHNICAL FIELD

The present specification generally relates to multilayer interference thin films for displaying high chroma red structural colors and, more specifically, multilayer interference thin films for displaying high chroma red structural colors in an omnidirectional manner.

BACKGROUND

Pigments made from multilayer structures are known. In addition, pigments that exhibit or provide a high chroma omnidirectional structural color are also known. Such pigments have required as many as 39 dielectric layers to obtain desired color properties and costs associated with production of multilayer pigments is proportional to the number of thin film layers. Accordingly, production of high chroma omnidirectional structural colors using multilayer thin films of dielectric materials can be cost prohibitive. The design of red color pigments face an additional hurdle to pigments of other colors such as blue, green, etc. Specifically, the control of angular independence for a red color is difficult since thicker dielectric layers are required, which results in a high harmonic design, i.e. the presence of the second and possible third harmonics is inevitable. Also, the hue space in Lab color space for dark red colors is very narrow and multilayer thin film that displays a red color has a higher angular variance.

Accordingly, a need exists for alternative multilayer interference thin films that have a reduction in the number of layers and reflect high chroma red structural colors in an omnidirectional manner.

SUMMARY

In one embodiment, a multilayer interference thin film that reflects an omnidirectional high chroma red structural color may include a multilayer thin film having a reflector layer, at least one absorber layer extending across the reflector layer, and an outer dielectric layer extending across the at least one absorber layer. The outer dielectric layer has a thickness of less than or equal to 2.0 quarter wave (QW) of a center wavelength of a single narrow band of visible light reflected by the multilayer thin film. The single narrow band of visible light has a visible full width half maximum (visible FWHM) width of less than 300 nanometers (nm), a red color between 0 and 30° on a Lab color space, and a hue shift of less than 30° on the Lab color space when the multilayer thin film is viewed at angles between 0-45° relative to a direction that is normal to an outer surface of the outer dielectric layer.

In another embodiment, an omnidirectional high chroma red structural color multilayer thin film for reflecting a red color that does not change appearance to a human eye when viewed at different angles may include a multilayer thin film with a reflector layer, a dielectric absorber layer extending across the reflector layer, a transparent absorber layer extending across the dielectric absorber layer and an outer dielectric layer extending across the transparent absorber layer. The outer dielectric layer has a thickness of less than or equal to 2.0 QW of a center wavelength of a single narrow band of visible light reflected by the multilayer thin film. The single narrow band of visible light has a visible FWHM width of less than 200 nm, a red color between 0 and 30° on a Lab color space, and a hue shift of less than 30° on the Lab color space when the multilayer thin film is viewed at angles between 0-45° relative to a direction that is normal to an outer surface of the outer dielectric layer. The dielectric absorber layer is made from at least one of an oxide and a nitride and has a thickness between 5-500 nm. The transparent absorber layer is made from at least one of chromium (Cr), germanium (Ge), nickel (Ni), stainless steel, titanium (Ti), silicon (Si), vanadium (V), titanium nitride (TiN), tungsten (W), molybdenum (Mo), niobium (Nb), and iron oxide ($Fe_2O_3$), and has a thickness between 5-20 nm.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1A depicts a multilayer thin film with a dielectric layer (D) extending over a reflector layer (R) used in the design of an omnidirectional high chroma red structural color multilayer thin film according to one or more embodiments shown and described herein;

FIG. 1B depicts a multilayer thin film with a semiconductor absorber layer (SA) extending over a reflector layer (R) used in the design of an omnidirectional high chroma red structural color multilayer thin film according to one or more embodiments shown and described herein;

FIG. 1C depicts a multilayer thin film with a dielectric absorber layer (DA) extending over a reflector layer (R) used in the design of an omnidirectional high chroma red structural color multilayer thin film according to one or more embodiments shown and described herein;

FIG. 2 depicts reflectance properties of the multilayer thin films illustrated in FIGS. 1A-1C on a Lab color space;

DETAILED DESCRIPTION

Figure 7:
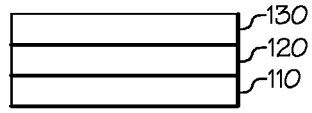
FIG. 7 depicts a multilayer thin film according to one or more embodiments shown and described herein.

FIG. 7 generally depicts one embodiment of a multilayer thin film which may be an omnidirectional reflector for reflecting high chroma red structural color. The multilayer thin film may generally have a reflector layer, at least one absorber layer that extends across the reflector layer, and an outer dielectric layer that extends across the at least one reflector layer. The at least one absorber layer absorbs light with wavelengths generally less than 550 nm when and the dielectric layer has thickness that provides reflection of light with wavelengths in the red color spectrum. The structure and properties of various multilayer thin films having omnidirectional reflectivity for high chroma red structural colors, methods of designing the multilayer thin film structures, and applications in which the structures may be employed will be described in more detail herein.

The multilayer thin film structures described herein may be used to omnidirectionally reflect wavelengths within the red spectrum of visible light over a range of angles of incidence or viewing. It will be understood that the terms "electromagnetic wave," "electromagnetic radiation," and "light," as used herein, may interchangeably refer to various wavelengths of light incidence on a multilayer thin film structure and that such light may have wavelengths in the ultraviolet (UV), infrared (IR), and visible portions of the electromagnetic spectrum.

Referring to FIGS. 1A-1C and 2, the effectiveness of different types of layers extending across a reflector layer in attaining a desired hue level in a red region of the visible light spectrum as plotted or shown on a Lab color space is depicted. FIG. 1A depicts a ZnS dielectric layer extending across a reflector layer, FIG. 1B depicts a Si semiconductor absorber layer extending across a reflector layer, and FIG. 1C depicts an $Fe_2O_3$ dielectric absorber layer extending across a reflector layer. Simulations of the reflectance from each multilayer thin film illustrated in FIGS. 1A-1C are performed as a function of different thicknesses for the dielectric layer, the semiconductor absorber layer and dielectric absorber layer. The results of the simulations are plotted on a Lab color space, also known as an a*b* color map, shown in FIG. 2. Each data point shown in FIG. 2 provides a chroma and a hue for particular thickness of the dielectric layer for the multilayer thin film depicted in FIG. 1A, the semiconductor absorber layer for the multilayer thin film depicted in FIG. 1B or the dielectric absorber layer for the multilayer thin film depicted in FIG. 1C. Chroma can be defined as $C=\sqrt{(a^{*2}+b^{*2})}$ and hue can be defined as $\tan^{-1}(a^*/b^*)$. The hue can also be referred to as the angle relative to the positive a*-axis of a given data point. A hue value provides a measure of the color displayed by an object, e.g. red, green, blue, etc., and a chroma value provides a measure of the color's "brightness." As shown in FIG. 2, the multilayer thin film illustrated in FIG. 1A provides low chroma compared to the multilayer thin films illustrated in FIGS. 1B-1C. Accordingly, FIGS. 1A-1C and 2 demonstrate that an absorber layer, e.g. a semiconductor layer or a dielectric absorber layer, is preferred over a dielectric layer as a first layer extending over a reflector layer when colors with high chroma are desired.

Figure 3A:
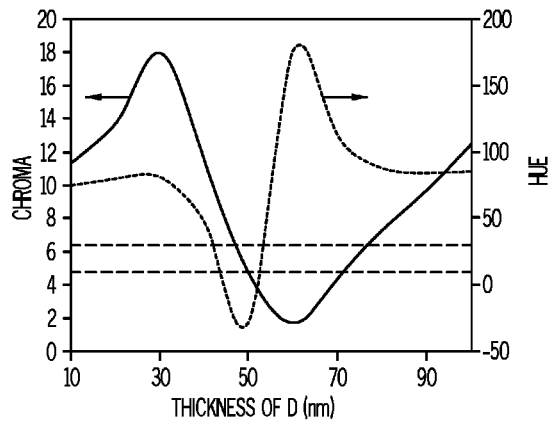
FIG. 3A graphically depicts chroma and hue values as a function of dielectric layer (D) thickness for the multilayer thin film illustrated in FIG. 1A.
Figure 3B:
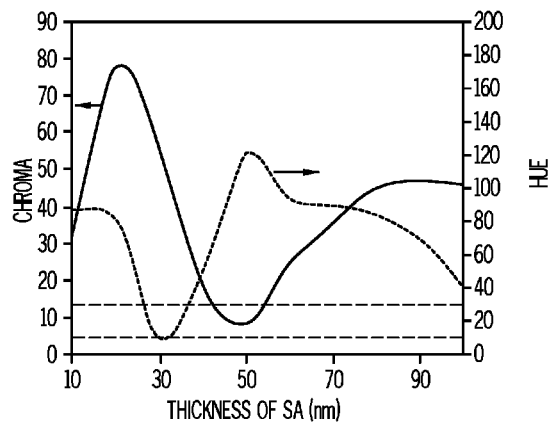
FIG. 3B graphically depicts chroma and hue values as a function of semiconductor absorber layer (SA) thickness for the multilayer thin film illustrated in FIG. 1B.
Figure 3C:
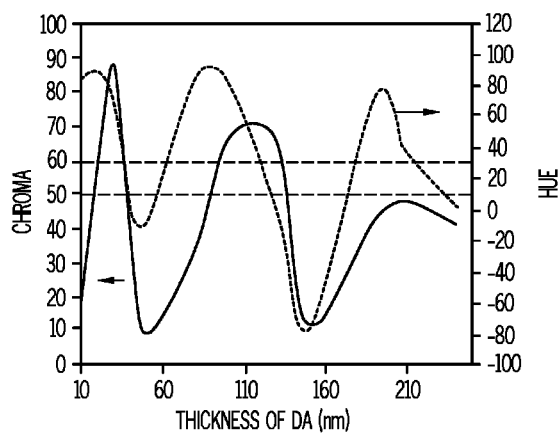
FIG. 3C graphically depicts chroma and hue values as a function of dielectric absorber layer (DA) thickness for the multilayer thin film illustrated in FIG. 1C.

Referring to FIGS. 3A-3C, chroma and hue as a function of layer thickness is depicted. Specifically, FIG. 3A graphically depicts the chroma and hue as a function of the thickness of the ZnS dielectric layer extending over the Al reflector layer illustrated in FIG. 1A. FIG. 3B depicts the chroma and hue as a function of the thickness of the Si semiconductor absorber layer extending over the Al reflector layer illustrated in FIG. 1B. FIG. 3C depicts the chroma and hue as a function of the thickness of the $Fe_2O_3$ dielectric absorber layer extending over the Al reflector layer illustrated in FIG. 1C. The dotted lines in FIGS. 3A-3C correspond to desired hue values between 10 and 30° on the Lab color space. FIGS. 3A-3C illustrate that higher chroma values within the hue range between 10-30° are achieved for multilayer thin films a semiconductor absorber layer or a dielectric absorber layer extending across a reflector layer. In embodiments, an outer dielectric layer extends across the absorber layer, e.g. the semiconductor absorber layer or the dielectric absorber layer.

In embodiments, an additional transparent absorber layer extends between the absorber layer and the outer dielectric layer. The location of the transparent absorber layer is chosen to increase the absorption of light wavelengths less than or equal to 550 nm but reflect light wavelengths of approximately 650 nm. Accordingly, the transparent absorber layer is placed at a thickness where the electric field ($|E|^2$) is less at the 550 nm wavelength than at the 650 nm wavelength. Mathematically, this can be expressed as:

$$|E_{550}|^2 << |E_{650}|^2 \qquad (1)$$

and preferably:

$$|E_{650}|^2 \approx 0 \qquad (2)$$

Figure 4:
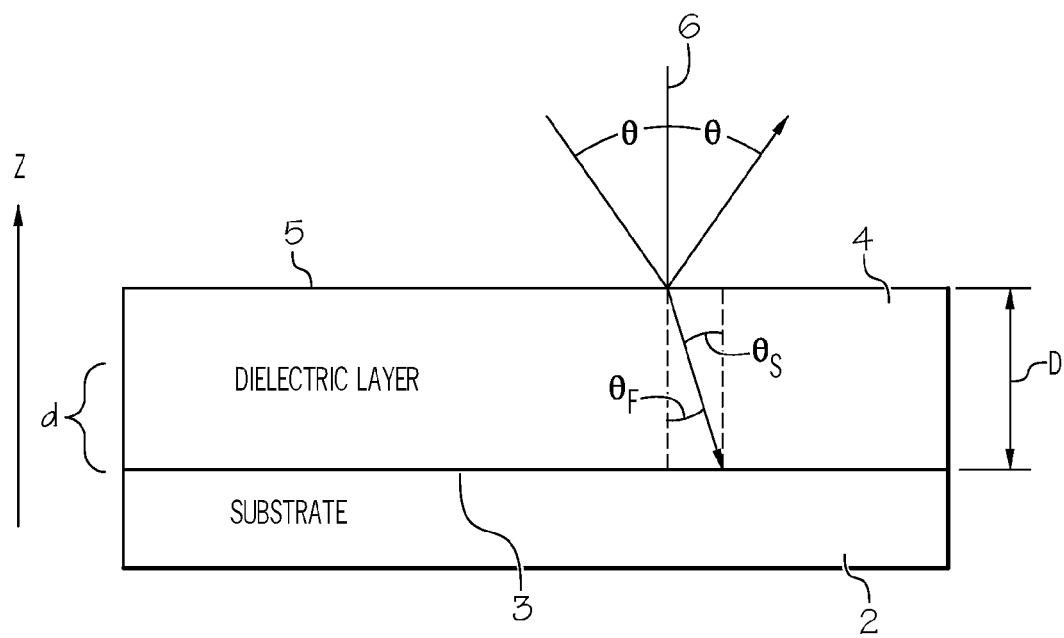
FIG. 4 depicts a multilayer thin film with a dielectric layer extending over a substrate layer and exposed to electromagnetic radiation at an angle θ relative to a normal direction to the outer surface of the dielectric layer.

In embodiments, FIG. 4 and the following discussion provide a method for the calculation of the thickness of a zero or near-zero electric field point at a given wavelength of light. For the purposes of the present specification, the term "near-zero" is defined $|E|^2 \le 10$. FIG. 4 illustrates a multilayer thin film with a dielectric layer 4 having a total thickness 'D', an incremental thickness 'd' and an index of refraction 'n' on a substrate layer 2 having an index of refraction $n_s$. The substrate layer 2 can be a core layer or a reflector layer of a multilayer thin film. Incident light strikes the outer surface 5 of the dielectric layer 4 at angle θ relative to line 6, which is perpendicular to the outer surface 5, and reflects from the outer surface 5 at the same angle θ. Incident light is transmitted through the outer surface 5 and into the dielectric layer 4 at an angle $\theta_F$ relative to the line 6 and strikes the surface 3 of substrate layer 2 at an angle $\theta_s$. For a single dielectric layer, $\theta_s = \theta_F$ and the energy/electric field (E) can be expressed as E(z) when z=d. From Maxwell's equations, the electric field can be expressed for s polarization as:

$$\vec{E}(d) = \{u(z), 0, 0\} \exp(ik\alpha y)|_{z=d} \quad (3)$$

and for p polarization as:

$$\vec{E}(d) = \left\{0, u(z), -\frac{\alpha}{\varepsilon(z)} v(z)\right\} \exp(ik\alpha y)\Big|_{z=d} \quad (4)$$

where $k = \frac{2\pi}{\lambda}$ and λ is a desired wavelength to be reflected. Also, $\alpha = n_s \sin\theta_s$ where 's' corresponds to the substrate in FIG. 5 and $\varepsilon(z)$ is the permittivity of the layer as a function of z. As such:

$$|E(d)|^2 = |u(z)|^2 \exp(2ik\alpha y)|_{z=d} \quad (5)$$

for s polarization and $$|E(d)|^2 = \left[|u(z)|^2 + \left|\frac{\alpha}{\sqrt{n}} v(z)\right|^2\right] \exp(2ik\alpha y)\Big|_{z=d} \quad (6)$$

for p polarization.

It is appreciated that variation of the electric field along the Z direction of the dielectric layer 4 can be estimated by calculation of the unknown parameters u(z) and v(z) where it can be shown that:

$$\begin{pmatrix} u \\ v \end{pmatrix}_{z=d} = \begin{pmatrix} \cos\varphi & (i/q)\sin\varphi \\ iq\sin\varphi & \cos\varphi \end{pmatrix} \begin{pmatrix} u \\ v \end{pmatrix}_{z=0, substrate} \quad (7)$$

where 'i' is the square root of −1. Using the boundary conditions $u|_{z=0} = 1$, $v|_{z=0} = q_s$, and the following relations:

$$q_s = n_s \cos\theta_s \text{ for } s\text{-polarization} \quad (8)$$

$$q_s = n_s/\cos\theta_s \text{ for } p\text{-polarization} \quad (9)$$

$$q = n \cos\theta_F \text{ for } s\text{-polarization} \quad (10)$$

$$q = n/\cos\theta_F \text{ for } p\text{-polarization} \quad (11)$$

$$\varphi = k \cdot n \cdot d \cos(\theta_F) \quad (12)$$

u(z) and v(z) can be expressed as:

$$u(z)|_{z=d} = u|_{z=0} \cos\varphi + v|_{z=0} \left(\frac{i}{q}\sin\varphi\right) \quad (13)$$

$$= \cos\varphi + \frac{i \cdot q_s}{q}\sin\varphi$$

and $$v(z)|_{z=d} = iqu|_{z=0} \sin\varphi + v|_{z=0} \cos\varphi \quad (14)$$

$$= iq\sin\varphi + q_s \cos\varphi$$

Therefore:

$$|E(d)|^2 = \left[\cos^2\varphi + \frac{q_s^2}{q^2}\sin^2\varphi\right] e^{2ik\alpha y} \quad (15)$$

$$= \left[\cos^2\varphi + \frac{n_s^2}{n^2}\sin^2\varphi\right] e^{2ik\alpha y}$$

for s polarization with $\varphi = k \cdot n \cdot d \cos(\theta_F)$, and:

$$|E(d)|^2 = \left[\cos^2\varphi + \frac{n_s^2}{n^2}\sin^2\varphi + \frac{\alpha^2}{n}(q_s^2\cos^2\varphi + q^2\sin^2\varphi)\right] \quad (16)$$

$$= \left[\left(1 + \frac{\alpha^2 q_s^2}{n}\right)\cos^2\varphi + \left(\frac{n_s^2}{n^2} + \frac{\alpha^2 q^2}{n}\right)\sin^2\varphi\right]$$

for p polarization where:

$$\alpha = n_s \sin\theta_s = n\sin\theta_F \quad (17)$$

$$q_s = \frac{n_s}{\cos\theta_s} \quad (18)$$

and $$q_s = \frac{n}{\cos\theta_F} \quad (19)$$

Thus for a simple situation where $\theta_F = 0$ or normal incidence, $\varphi = k \cdot n \cdot d$, and $\alpha = 0$:

$$|E(d)|^2 \text{ for } s\text{-polarization} = |E(d)|^2 \text{ for } p\text{-polarization} \quad (20)$$

$$= \left[\cos^2\varphi + \frac{n_s^2}{n^2}\sin^2\varphi\right]$$

$$= \left[\cos^2(k \cdot n \cdot d) + \frac{n_s^2}{n^2}\sin^2(k \cdot n \cdot d)\right] \quad (21)$$

which allows for the thickness '41' to be solved for, i.e. the position or location within the dielectric layer where the electric field is zero. It is appreciated that the thickness '41' can also be the thickness of a dielectric layer extending over an absorber layer that provides a zero or near zero electric field at the interface between the dielectric layer and the absorber.

Figure 5:
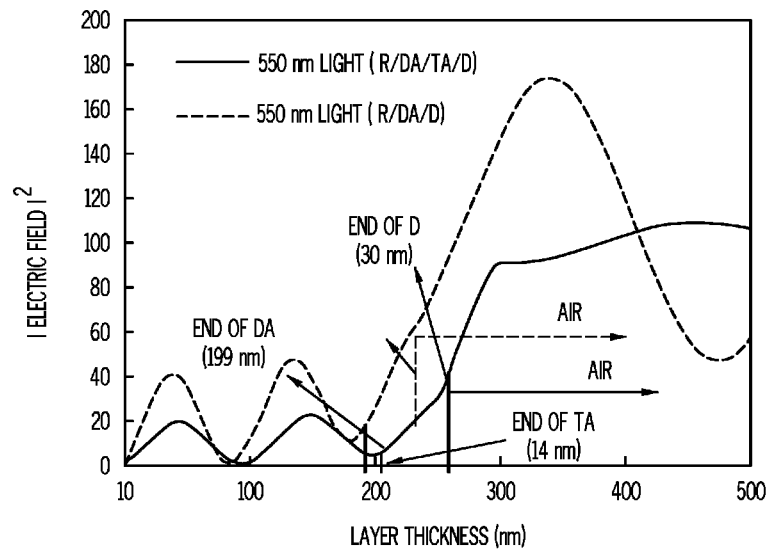
FIG. 5 graphically depicts electric field values (|Electric Field|$^2$) as a function of layer thickness for two multilayer thin films exposed to 550 nm wavelength light, one of the multilayer thin films having a dielectric absorber layer extending over a reflector layer, a transparent absorber layer extending over the dielectric absorber layer and a dielectric layer extending over the transparent absorber layer (R/DA/TA/D) and one of the multilayer thin films having a dielectric absorber layer extending over a reflector layer and a dielectric layer extending over the dielectric absorber layer (R/DA/D)

Referring to FIG. 5, electric field as a function of layer thickness for embodiments of a multilayer thin film with a zero or near-zero electric field at the interface between the transparent absorber layer and the outer dielectric layer represented by the vertical line located slightly to the right of 200 nm on the X-axis is shown by the solid line. The multilayer thin film that provides the electric field represented by the solid line in FIG. 5 has an Al reflector layer (R) with a thickness of 100 nm, an $Fe_2O_3$ dielectric absorber layer (DA) with a thickness of 199 nm extending across the Al reflector layer R, a Cr transparent absorber layer (TA) with a thickness of 14 nm extending across the $Fe_2O_3$ dielectric absorber layer DA, and an outer ZnS dielectric layer (D) with a thickness of 30 nm extending over the transparent absorber layer. The structure of the multilayer thin film that provides the electric field represented by the solid line in FIG. 5 can be described as D/DA/TA/D as shown in the figure. It is appreciated that the term "transparent absorber layer" refers to an absorber layer with a thickness that allows light to appear to pass through the layer. For comparison, a multilayer thin film that provides an electric field represented by the dotted line in FIG. 5 has an Al reflector layer R with a thickness of 100 nm, a dielectric absorber layer DA with a thickness of 200 nm extending across the Al reflector layer R, and an outer ZnS dielectric layer D with a thickness of 30 nm extending across the dielectric absorber layer DA (R/DA/D). As shown in FIG. 5, a higher electric field is present at the interface between the dielectric absorber layer and the outer dielectric layer for the R/DA/D multilayer thin film than is present at the interface between the dielectric absorber layer and the transparent absorber layer for the R/DA/TA/D multilayer thin film. Accordingly, a greater amount of the 550 nm wavelength light reaches (is not reflected) the dielectric absorber layer and is absorbed for the R/DA/TA/D multilayer thin film than for the R/DA/D multilayer thin film. Also, the electric filed is lower at the interface between the outer dielectric layer and air for the R/DA/TA/D multilayer thin film that at the interface between the outer dielectric layer and air for the R/DA/D multilayer thin film. Accordingly, less of the 550 nm wavelength light is reflected at the outer surface of the outer dielectric layer for the R/DA/TA/D multilayer thin film than at the outer surface of the outer dielectric layer for the R/DA/D multilayer thin film.

Figure 6:
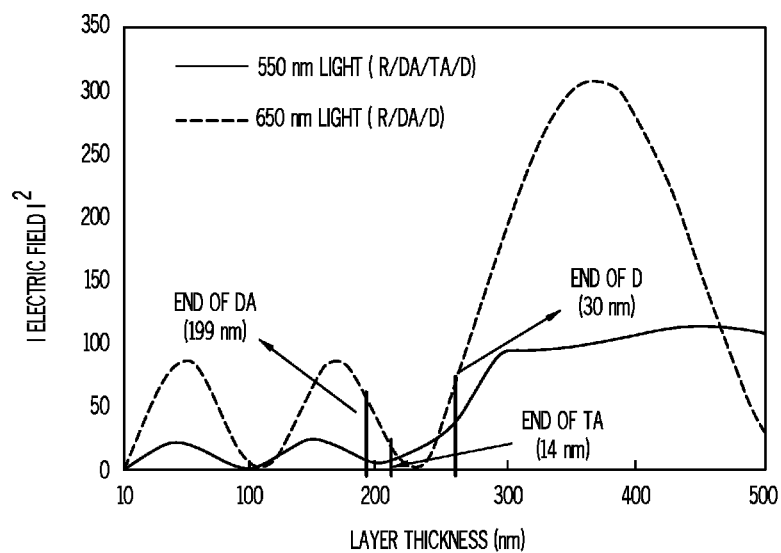
FIG. 6 graphically depicts electric field ($|Electric\ Field|^2$) as a function of layer thickness for the R/DA/TA/D multilayer thin film when exposed to 550 nm and 650 nm wavelengths of light.

Referring to FIG. 6, electric field as a function of layer thickness for the R/DA/TA/D multilayer thin film exposed to 550 nm and 650 nm wavelength light is shown. The multilayer thin film has the same the structure and materials as the R/DA/TA/D multilayer thin film discussed above regarding FIG. 5, i.e. an Al reflector layer (R) with a thickness of 100 nm, an $Fe_2O_3$ dielectric absorber layer (DA) with a thickness of 199 nm extending across the Al reflector layer R, a Cr transparent absorber layer (TA) with a thickness of 14 nm extending across the $Fe_2O_3$ dielectric absorber layer DA, and an outer ZnS dielectric layer (D) with a thickness of 30 nm extending over the transparent absorber layer. As shown in FIG. 6, the electric field at the interface between the dielectric absorber layer and the transparent absorber layer represented by the vertical line located just less than 200 nm on the X-axis is much less for the 550 nm wavelength light (solid line) than for the 650 nm wavelength light (dotted line). Accordingly, the dielectric absorber layer absorbs much more of the 550 nm wavelength light than the 650 nm wavelength light, and reflects much more of the 650 nm wavelength light than the 550 nm wavelength light.

Referring now to FIG. 7, a multilayer thin film 10 that reflects an omnidirectional high chroma red structural color according to embodiments disclosed herein is shown. The multilayer thin film 10 includes a reflector layer 110, at least one absorber layer 120 extending across the reflector layer 110, and an outer dielectric layer 130 extending across the at least one absorber layer 120. In embodiments, the "outer dielectric layer" has an outer free surface, i.e. an outer surface not in contact with an absorber layer or another dielectric layer that is not part of a protective coating. It is appreciated that a second at least one absorber layer and a second outer dielectric layer can be located on another side of the reflector layer 110 such that the reflector layer 110 is a core layer sandwiched between a pair of absorber layers and a pair of outer dielectric layers. Such a multilayer thin film with a core layer sandwiched between a pair of absorber layers and a pair of outer dielectric layers can be referred to as a five-layer multilayer thin film. The reflector layer can have a thickness between 5-200 nm and be made from at least one of a "gray metallic" material such as Al, Ag, Pt, Sn, etc., at least one of a "colorful metallic" material such as Au, Cu, brass, etc., at least one of a colorful dielectric material such as $Fe_2O_3$, TiN, or a combination thereof. The at least one absorber layer 120 can have a thickness between 5-500 nm and be made from at least one of an absorber metallic material such as Cr, Cu, Au, brass, etc., at least one colorful dielectric material such as $Fe_2O_3$, TiN, etc., at least one semiconductor absorber material such as amorphous Si, Ge, etc., or a combination thereof. The outer dielectric layer can have a thickness of less than 2 QW of a center wavelength (e.g. 650 nm) for a narrow band of visible light reflected by the multilayer thin film. The outer dielectric layer can be made from a dielectric material with a refractive index greater than 1.6 such as ZnS, $MgF_2$, etc.

Figure 8:
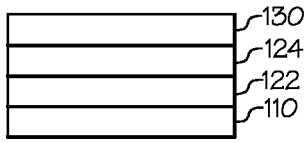
FIG. 8 depicts a multilayer thin film according to one or more embodiments shown and described herein.

Referring now to FIG. 8, a multilayer thin film 12 that reflects an omnidirectional high chroma red structural color according to embodiments disclosed herein is shown. The multilayer thin film 10 includes a reflector layer 110, an absorber layer 122 extending across the reflector layer 110, a transparent absorber layer 124 extending over the absorber layer 122, and an outer dielectric layer 130 extending across the transparent absorber layer 124. The absorber layer 122 can be a metal absorber layer, a dielectric absorber layer or a semiconductor absorber layer. It is appreciated that a second absorber layer, a second transparent absorber layer and a second outer dielectric layer can be located on another side of the reflector layer 110 such that the reflector layer 110 is a core layer sandwiched between a pair of absorber layers, a pair of transparent absorber layers and a pair of outer dielectric layers. Such a multilayer thin film with a core layer sandwiched between a pair of absorber layers, a pair of transparent absorber layers and a pair of outer dielectric layers can be referred to as a seven-layer multilayer thin film. The reflector layer can have a thickness between 5-200 nm and be made from at least one of a "gray metallic" material such as Al, Ag, Pt, Sn, etc., at least one of a "colorful metallic" material such as Au, Cu, brass, etc., at least one of a colorful dielectric material such as $Fe_2O_3$, TiN, or a combination thereof. The absorber layer 120 can have a thickness between 5-500 nm and be made from at least one of an absorber metallic material such as Cr, Cu, Au, brass, etc., a dielectric absorber materials such as $Fe_2O_3$, TiN, etc., semiconductor absorber materials such as amorphous Si, Ge, etc., or combinations thereof. The transparent absorber layer can have a thickness between 5-20 nm and be made from at least one of Cr, Ge, Ni, stainless steel, Ti, Si, V, TiN, W, Mo, Nb and $Fe_2O_3$. The outer dielectric layer can have a thickness of less than 2 QW of a center wavelength (e.g. 650 nm) for a narrow band of visible light reflected by the multilayer thin film and be made from a dielectric material with a refractive index greater than 1.6 such as ZnS, $MgF_2$, etc.

Figure 9:
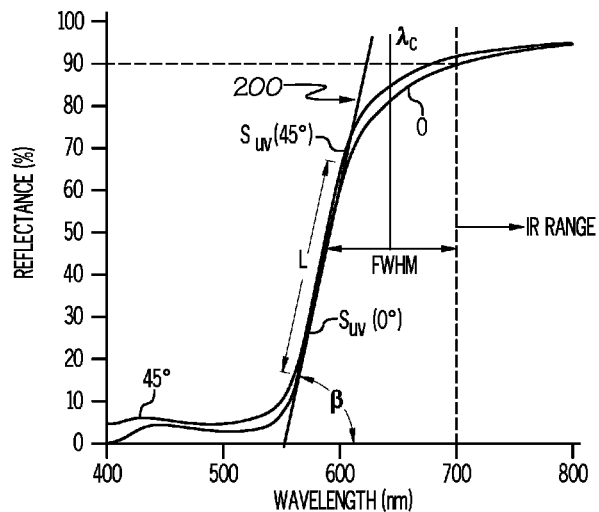
FIG. 9 graphically depicts percent reflectance as a function of wavelength for a multilayer thin film according to one or more embodiments shown and described herein illuminated with white light and viewed at 0° and 45° relative to a direction that is normal to an outer surface of the multilayer thin film.

Referring now to FIG. 9, a representative reflectance spectrum in the form of percent reflectance versus reflected light wavelength provided by one or more embodiments disclosed herein when illuminated with white light at angles of 0 and 45° relative to the direction that is normal to an outer surface of a multilayer thin film the is shown. As shown by the reflectance spectrum, both the 0° and 45° curves illustrate very low reflectance, e.g. less than 10%, for wavelengths less than 550 nm. However, a sharp increase in reflectance at wavelengths between 560-570 nm that reaches a maximum of approximately 90% at 700 nm is observed. It is appreciated that the portion or region of the graph on the right hand side OR side) of the curve represents the IR-portion of the reflection band provided by embodiments. The sharp increase in reflectance is characterized by a UV-sided edge of the 0° curve ($S_{UV}(0°)$) and the 45° curve ($S_{UV}(45°)$)

that extend from a low reflectance portion at wavelengths below 550 nm up to a high reflectance portion, for example greater than 70%, preferably greater than 80% and more preferably greater than 90% reflectance. A measure of the degree of omnidirectionality provided by embodiments can be the shift between $S_{UV}(0°)$ and $S_{UV}(45°)$ edges at the visible FWHM location. A zero shift, i.e. no shift between the $S_{UV}(0°)$ and $S_{UV}$ (45°) edges would characterize a perfectly omnidirectional multilayer thin film. However, a shift between $S_{UV}(0°)$ and $S_{UV}(45°)$ edges for embodiments disclosed herein is less than 100 nm, preferably less than 75 nm, more preferably less 50 nm and still more preferably less than 25 nm, which to the human eye can appear as though the surface of the multilayer thin film does not changed color when viewed at angles between 0 and 45° and from a human eye perspective the multilayer thin film is omnidirectional. A linear portion 200 of the UV-sided edge is inclined at an angle ($\beta$) greater than 60° relative to the X-axis, has a length L of approximately 40 on the Reflectance-axis and a slope of 1.4. In embodiments, the linear portion is inclined at an angle greater than 70° relative to the x-axis. In other embodiments, linear portion is inclined at an angle greater than 75°. The reflection band has a visible FWHM of less than 300 nm, preferably less than 200 nm, more preferably less than 150 nm, and still more preferably less than 100 nm. The center wavelength $\lambda c$ for the visible reflection band illustrated in FIG. 9 is defined as the wavelength that is equal-distance between the UV-sided edge of the reflection band and the IR edge of the IR spectrum at the visible FWHM. It is appreciated that the term "visible FWHM" refers to the width of the reflection band between the UV-sided edge of the curve and the edge of the IR spectrum range, beyond which reflectance provided by the omnidirectional reflector is not visible to the human eye. It should be appreciated that embodiments disclosed herein use the non-visible IR portion of the electromagnetic radiation spectrum to provide a sharp or structural color, i.e. embodiments disclosed herein take advantage of the non-visible IR portion of the electromagnetic radiation spectrum to provide a narrow band of reflected visible light, although a much broader band of electromagnetic radiation may extend into the IR region.

Figure 10:
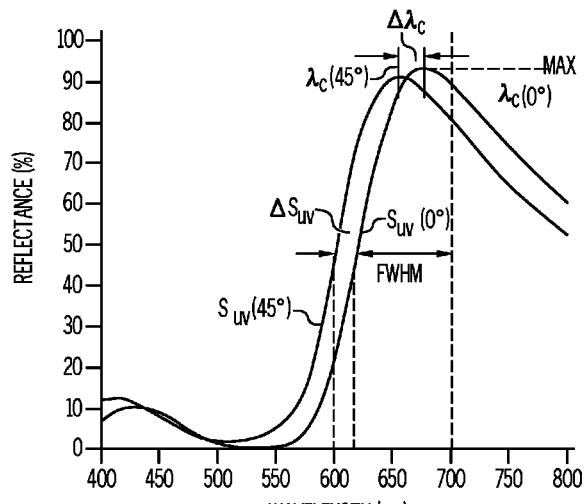
FIG. 10 graphically depicts percent reflectance as a function of wavelength for a multilayer thin film according to one or more embodiments shown and described herein illuminated with white light and viewed at 0° and 45° relative to a direction that is normal to an outer surface of the multilayer thin film.

Referring now to FIG. 10, a reflectance spectrum for a multilayer thin film according to embodiments disclosed herein illustrates a narrow band of visible light with a peak in the visible spectrum. The peak is the wavelength with a maximum reflectance and can define a center wavelength for the reflectance curve displayed by the multilayer thin film when viewed normal to an outer surface of the multilayer thin film ($\lambda c(0°)$) and a center wavelength for the reflectance curve displayed by the multilayer thin film when viewed at a 45° angle relative to the outer surface of the multilayer thin film ($\lambda c(45°)$). A shift or displacement of $\lambda c$ when the outer surface of the multilayer thin film is viewed from an angle 45° ($\lambda c(45°)$), e.g. the outer surface is tilted 45° relative to a human eye looking at the surface, compared to when the surface is viewed from an angle of 0° (($\lambda c(0°)$), i.e. normal to the surface is shown in FIG. 10. The shift of $\lambda c$ ($\Delta\lambda c$) provides a measure of the omnidirectional property of the omnidirectional reflector. A zero shift of $\lambda c$, i.e. $\Delta\lambda c \approx 0$, would represent reflectance from a perfectly omnidirectional multilayer thin film. However, embodiments disclosed provide a $\Delta\lambda c$ of less than 100 nm, preferably less than 75 nm, more preferably less than 50 nm, and still more preferably less than 25 nm, which to the human eye can appear as though the surface of the reflector has not changed color when viewed from angles between 0 and 45° and from a human eye perspective the multilayer thin film is omnidirectional. The shift in $\Delta\lambda c$ can be determined by a reflectance versus wavelength plot measured from a multilayer thin film exposed to white light, or by modeling of the multilayer thin film. It is appreciated that the narrow band of reflected visible light illustrated in FIG. 10 provides a red color and that the low shift or displacement of the center wavelength when the multilayer thin film structure is viewed at angles between 0 and 45° provides an omnidirectional red structural color, i.e. the multilayer thin film reflects a bright red color that does not appear to change color to the human eye when viewed at angles between 0 and 45°.

Both the 0° and 45° curves in the FIG. 10 illustrate very low reflectance, e.g. less than 10%, for wavelengths less than 550 nm. However, a sharp increase in reflectance at wavelengths between 560-570 nm that reaches a maximum of approximately 90% at 700 nm is observed. It is appreciated that the portion or region of the graph on the right hand side (IR side) of the curve represents the IR-portion of the reflection band provided by embodiments. The sharp increase in reflectance is characterized by a UV-sided edge of the 0° curve ($S_{UV}(0°)$) and the 45° curve ($S_{UV}(45°)$) that extend from a low reflectance portion at wavelengths below 550 nm up to a high reflectance portion, for example greater than 70%, preferably greater than 80% and more preferably greater than 90% reflectance. The reflection band has a visible FWHM of less than 300 nm, preferably less than 200 nm, more preferably less than 150 nm, and still more preferably less than 100 nm. It is appreciated that the narrow band of reflected visible light illustrated in FIG. 10 provides a red color and that the low shift or displacement of the center wavelength when the multilayer thin film structure is viewed at angles between 0 and 45° provides an omnidirectional red structural color, i.e. the multilayer thin film reflects a bright red color that does not appear to change color to the human eye when viewed at angles between 0 and 45°.

Figure 11:
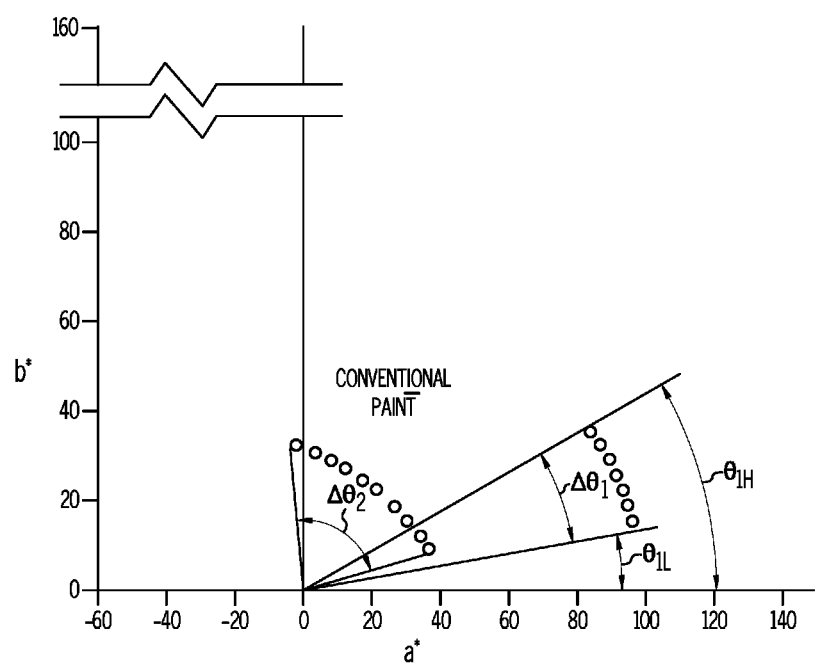
FIG. 11 graphically depicts color on a Lab color space for a multilayer thin film according to one or more embodiments shown and described herein illuminated by white light and viewed from different angles relative to a direction that is normal to an outer surface of the multilayer thin film.

Referring to FIG. 11, the reflectance properties of multilayer thin films according to embodiments disclosed herein can also be described on a Lab color space. The Lab color space has an X coordinate of a* and a Y coordinate of b*. FIG. 11 illustrates the reflectance properties of conventional paint when viewed between 0 to 45° with a hue shift illustrated as $\Delta\theta_2$. In comparison, multilayer thin films according to embodiments disclosed herein provide a small hue shift ($\Delta\theta_1$) when viewed between 0 and 45°. The shift in hue as represented by $\Delta\theta_1$ in FIG. 11 is less than 30°, preferably less than 25°, more preferably less than 20°, and still more preferably less than 15°. FIG. 11 also illustrates that the multilayer thin films according to embodiments disclosed herein provide a hue corresponding to a red color, i.e. a hue between $\theta_{1L}$ and $\theta_{1H}$. In embodiments, the multilayer thin films provide a hue between 0 and 30° on the Lab color space, preferably between 5 and 25° on the Lab color space, and more preferably between 10-22° on the Lab color space. In embodiments, the multilayer thin films structures according to embodiments disclosed herein have a hue shift when viewed from 0 and 45° such that the observed color displayed by the multilayer thin film structures has a hue within region illustrated by $\theta_{1H}$-$\theta_{1L}$. It should be appreciated that the chroma for the multilayer thin films according to embodiments disclosed herein is much greater than conventional paints. In embodiments, the chroma for multilayer thin films can range between 60-120, preferably between 80-110, and more preferably between 85-105.

The multilayer thin films in embodiments disclosed herein can be used as pigments, e.g. paint pigments for a paint used to paint an object, or a continuous thin film applied to an object. When used as pigments, paint binders, fillers, etc., can be used and mixed with the pigments to provide a paint that displays an omnidirectional high chroma red structural color. It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A multilayer interference thin film that reflects an omnidirectional high chroma red structural color comprising:
    a multilayer thin film having a reflector layer, at least one absorber layer extending across the reflector layer; and an outer dielectric layer extending across the at least one absorber layer;
    wherein the multilayer thin film reflects a single narrow band of visible light when exposed to white light and the outer dielectric layer has a thickness of less than or equal to 2.0 quarter wave (QW) of a center wavelength of the single narrow band of visible light, the single narrow band of visible light having:
        a visible full width half maximum (FWHM) width of less than 200 nm;
        a color between 0° and 30° on a Lab color space; and
        a hue shift of less than 30° on the Lab color space when the multilayer thin film is viewed at angles between 0-45° relative to a direction normal to an outer surface of the outer dielectric layer.

2. The multilayer interference thin film of claim 1, wherein the reflector layer has a thickness between 5-200 nm and is made from at least one of Al, Ag, Pt and Sn.

3. The multilayer interference thin film of claim 1, wherein the at least one absorber layer is at least one dielectric absorber layer extending between the reflector layer and the outer dielectric layer.

4. The multilayer interference thin film of claim 3, wherein the at least one dielectric absorber layer is made from at least one of an oxide and a nitride.

5. The multilayer interference thin film of claim 4, wherein the at least one dielectric absorber layer is made from at least one of $Fe_2O_3$ and TiN, and has a thickness between 5-500 nm.

6. The multilayer interference thin film of claim 1, wherein the outer dielectric layer has an index of refraction greater than 1.6.

7. The multilayer interference thin film of claim 6, wherein the outer dielectric layer is made from at least one of $MgF_2$, ZnS and $TiO_2$.

8. The multilayer interference thin film of claim 7, wherein the center wavelength of the single narrow band of reflected visible light is between 600-700 nm and the thickness of the outer dielectric layer is less than 175 nm.

9. The multilayer interference thin film of claim 1, wherein the at least one absorber layer is a dielectric absorber layer and a transparent absorber layer.

10. The multilayer thin film of claim 9, wherein the transparent absorber layer extends across the dielectric absorber layer and is located between the dielectric absorber layer and the outer dielectric layer.

11. The multilayer interference thin film of claim 9, wherein the dielectric absorber layer is made from at least one of $Fe_2O_3$ and TiN.

12. The multilayer interference thin film of claim 10, wherein the dielectric absorber layer has a thickness between 5-500 nm.

13. The multilayer interference thin film of claim 9, wherein the transparent absorber layer is made from at least one of Cr, Ge, Ni, stainless steel, Ti, Si, V, TiN, W, Mo, Nb and $Fe_2O_3$.

14. The multilayer interference thin film of claim 13, where the transparent absorber layer has a thickness between 5-20 nm.

15. The multilayer interference thin film of claim 1, wherein the single narrow band of visible light has a visible FWHM width of less than 200 nm, a color between 5° and 25° on the Lab color space, and a hue shift of less than 20° on the Lab space color map when the multilayer thin film is viewed at angles between 0-45° relative to a direction normal to an outer surface of the outer dielectric layer.

16. The multilayer interference thin film of claim 1, wherein the single narrow band of visible light has a visible FWHM width of less than 200 nm, a color between 10° and 25° on the Lab color space, and a hue shift of less than 15° on the Lab space color map when the multilayer thin film is viewed at angles between 0-45° relative to a direction normal to an outer surface of the outer dielectric layer.

17. An omnidirectional high chroma red structural color multilayer thin film comprising:
    a multilayer thin film having a reflector layer, a dielectric absorber layer extending across the reflector layer, an outer dielectric layer extending across the dielectric absorber layer and a transparent absorber layer extending between the dielectric absorber layer and the outer dielectric layer;
    wherein the multilayer thin film reflects a single narrow band of visible light when exposed to white light and the outer dielectric layer has a thickness of less than or equal to 2.0 quarter wave (QW) of a center wavelength of the single narrow band of visible light, the single narrow band of visible light having:
        a visible full width half maximum (FWHM) FWHM width of less than 200 nm;
        a color between 0° and 30° on a Lab color space; and
        a hue shift of less than 30° on the Lab color space when the multilayer thin film is viewed at angles between 0-45° relative to a direction normal to an outer surface of the outer dielectric layer.

18. The omnidirectional high chroma red structural color multilayer thin film of claim 17, wherein the dielectric absorber layer is made from at least one of an oxide and a nitride, and has a thickness between 5-500 nm.

19. The omnidirectional high chroma red structural color multilayer thin film of claim 18, wherein the dielectric absorber layer is made from at least one of $Fe_2O_3$ and TiN.

20. The omnidirectional high chroma red structural color multilayer thin film of claim 17, wherein the transparent absorber layer is made from at least one of Cr, Ge, Ni, stainless steel, Ti, Si, V, TiN, W, Mo, Nb and $Fe_2O_3$, and has a thickness between 5-20 nm.

* * * * *